E. A. SPERRY.
APPARATUS FOR DETERMINATION OF PERIODIC MOTION.
APPLICATION FILED AUG. 8, 1912.

1,071,815. Patented Sept. 2, 1913.

WITNESSES
INVENTOR

UNITED STATES PATENT OFFICE.

ELMER A. SPERRY, OF BROOKLYN, NEW YORK.

APPARATUS FOR DETERMINATION OF PERIODIC MOTION.

1,071,815.      Specification of Letters Patent.      Patented Sept. 2, 1913.

Application filed August 8, 1912. Serial No. 714,025.

*To all whom it may concern:*

Be it known that I, ELMER A. SPERRY, a citizen of the United States, residing at Brooklyn, in the county of Kings and State of New York, have invented certain new and useful Improvements in Apparatus for Determination of Periodic Motion, of which the following is a specification.

My invention relates to method and apparatus for determination of periodic reoccurrence of phenomena such as rotation, especially where the reoccurrences or periods are high.

The improvement in the method relates to the specific illumination of the visual indicator upon the moving part and the apparatus is illustrated more particularly by a portable unitary structure adapted to conveniently and rapidly make the determinations described.

My invention may be embodied in various forms, some of which, including the preferred form, are illustrated in the accompanying drawings, forming a part hereof, serving to illustrate the principles and actions involved.

Figure 8:
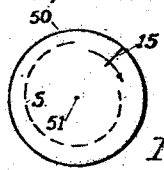
Figure 7:
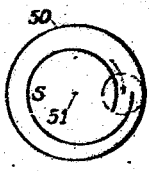
Figure 6:
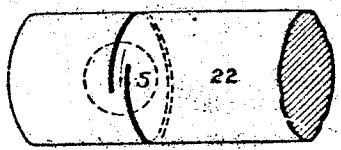
Figure 9:
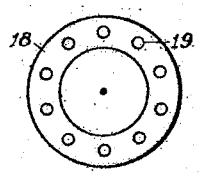
Figure 10:
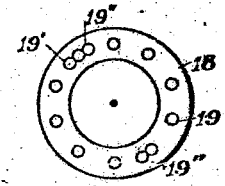
Figure 1:
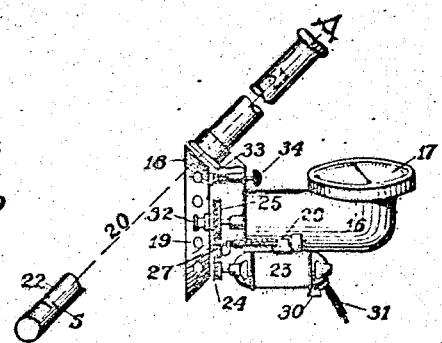
Figure 2:
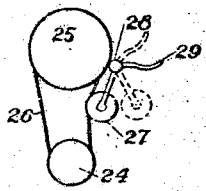
Figure 4:
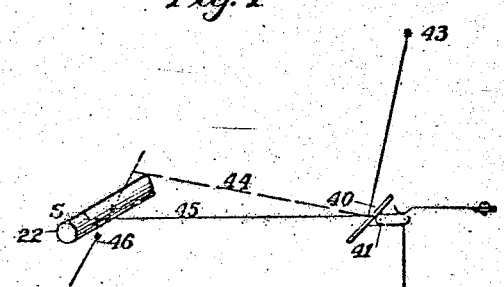
Figure 3:
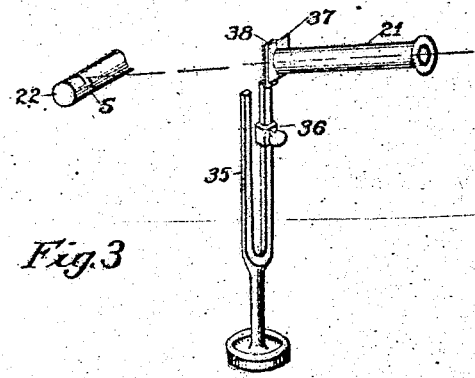
Figure 5:
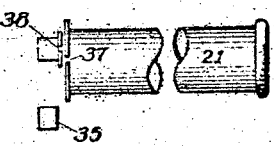

In the drawings Figure 1 illustrates one form of stroboscope showing the line of sight to a rapidly revolving object. Fig. 2 shows a detail. Figs. 3 and 4 are alternative constructions, both involving the spiral, or equivalent, upon the moving member. Fig. 5 shows the detail of construction shown in Fig. 3. Fig. 6 illustrates a cylindrical spiral. Fig. 7 shows where the spiral is placed on the face of a disk. Fig. 8 is a varied form of spiral. Figs. 9 and 10 are details of the disks of the stroboscope shown in Fig. 1.

Stroboscopic devices have been heretofore employed to mark periodic occurrences and to determine their rate, but these have been used invariably in connection with objects or markings which either pass in and out of view or pass the line of vision with rapidity, in most instances almost instantaneously. As, for instance, a radial mark upon a disk such as is shown at 15 in Fig. 8, or a spoke in a revolving wheel.

In making periodic determinations, especially at high speeds, and particularly in connection with the rapidly rotating gyroscope wheels of my gyroscopic compass, I find it extremely difficult to discern such a line as line 15 in Fig. 8, and after many failures to make proper determinations of speeds, and upon analysis of the difficulty, I determined that the fault was one of specific illumination. That is: suppose the line 15, or similar object to be observed, subtended 1° of arc. The time during which the line was under observation at any given point would then be a little more than one-quarter of one per cent. of the total time of the observation; so it may be stated that, in a sense, the specific illumination in this instance represents only 1/360 of the illumination which should be available in determinations of this class. To correct this difficulty and raise the per cent. of specific illumination, I utilize motion to the normal or at right angles to the actual travel of the face, or having a component lying at right angles to the travel of the object involved or to the line of vision or both. This may be accomplished by employing on such face a continuous, or practically continuous line which progressively travels laterally, such as a spiral plainly seen in the figures. By this method of procedure I secure illumination that amounts to 100%, inasmuch as the spiral is at no time out of sight and may be at all times observed, and is plainly seen to constantly move in one direction or another, depending upon whether the spiral is rendered visible more rapidly or less rapidly than the revolutions of the surface carrying the spiral. When the visualizing is exactly in period with the revolutions the line is seen to stand still.

A refinement of this method extends still further: Not only may the number of revolutions, or period of the moving object, be accurately determined, but this determination extends to a single fraction of a revolution inasmuch as where necessary it is found easy to observe a given point of the spiral, meaning that the same fraction of one cycle of motion is being constantly observed.

The process consists generally of visualizing a spiral S periodically. This may be by means of opening and closing an aperture such as is shown in Figs. 1 and 3, or by periodic illumination as shown in Fig. 4.

Referring now to Fig. 1. The tachometer 16, with its dial 17, indicates the rate of revolution of the disk 18. This disk may be of any suitable form, such, for instance, as the truncated cone of the figure, or a cylinder may be employed. In any event one or more apertures 19 are provided in the disk. These apertures for the present purpose are equally spaced and are rapidly brought in line of vision 20, for instance, under the peering tube 21, which if employed may be in the line of sight with the spiral S, upon the revolving object 22.

Any method of rotating the disk may be employed as a motor 23, driving pulley 24, (see Fig. 2) driving the disk 18 or moving the apertures 19. The transmission between driving pulley 24 and driven pulley 25 is by means of a belt 26 with a belt tightener 27 swinging upon the pivot 28 and normally operated by thumbpiece 29. The motor may be provided with on-and-off switch 30 and flexible electric cable 31. A brake or retarding device 33 for disk 18 is shown as being operated by handle 34. It will be understood that the spiral S is upon a visible surface which may pass the line of sight at right angles, or at a substantial angle to the axis of such line. This surface is illustrated in Figs. 1, 3, 4 and 6 by the revolving object, or shaft 22 and in Figs. 7 and 8 by the disk 50 having its axis at 51.

Another method of periodically visualizing the spiral S may be by a tuning fork 35 which may be varied as to period, as by adjustable weight 36, and which is made to produce periodic coincidences between the slot 37 in the stationary member and slot 38 vibrating with the fork, as will readily be understood from Figs. 3 and 5. The visualizing of spiral S in Fig. 4 is done by periodic illumination controlled by the mirror 40, pivoted at 41 and operated as by cam, eccentric or other to-and-fro moving object illustrated at 42. The source of illumination is indicated at 43 and the beam is deflected as indicated at 44 and 45. The beam is intercepted at all times by screen 46 when it is not desired to visualize the spiral through the aperture provided within the screen which is shown in Fig. 4 as a line, and the aperture as shown as a break in the line at its center opposite the spiral S. It will readily be understood that one-half of the screen only might be used, as, for instance, that part or half marked 46, and the unlettered part removed entirely. In this case a part of the rotating element 22 would be behind the screen and therefore out of view.

As illustrating a method of changing the number of apertures 19 in the disk 18, or its equivalent, two disks may be used as shown in Figs. 9 and 10, each provided with ten equidistant apertures 19, shown in these figures, but one also provided with a hole marked 19' and also with a pair of holes marked 19". Thumbscrew 32 serves to secure these disks nested as shown in Fig. 1.

It will be seen that the disks may be secured in a position in which the series of holes 19 may register, whereupon a multiple of 10 is used in connection with the scale 17. When the two holes 19" register with any pair of holes on the other disk then a multiple of 2 is employed with the scale 17. And when the aperture 19' registers no multiple is necessary as there is but one aperture in each revolution of the disk 18 open.

Referring now to Fig. 8, it may be here seen that the spiral is less than a circumference in length and is made up of a succession of dots or short lines. This illustrates the fact that I have discovered that any arrangement or means may be employed which, when the surface is in motion, will give the effect of a visible line progressively moving laterally or which has a component of motion lying normal to the line of motion of the surface or object which is being observed or the line of sight of the observer, or both. Dotted circles in Figs. 6 and 7 indicate a possible position of a window when the moving object is within a casing or other shield.

The use and operation is entirely apparent from the foregoing description and need not be further outlined except to point out some of the uses which have not been mentioned: For instance, the use of visualizing certain portions only of the spiral to the exclusion of other portions in each revolution or cycle of periodic operation may be pointed out as follows: Should the eccentricity or periodic motion illustrated at 42 in Fig. 4 be of the rotating object itself, or, for instance, the shaft or hub of the revolving body 22, and if the motion of the mirror 40 is produced by vibrations due to out-of-balance of such mass, then the particular portion of the spiral which is seen illuminated may be utilized to locate the out-of-balance factor of the revolving mass.

Many other uses will occur to those conversant with the art to which these devices relate.

I claim—

1. As a means for determining speed of rotation and the position of an object during such rotation, a visible surface connected with such object; means, when the surface is in motion, for giving the effect of a visible line progressively moving laterally or normal to the line of motion of the said surface in combination with a device for periodically rendering the said means visible.

2. As a means for determining speed of rotation and the position of an object during such rotation, a visible surface connected with such object; means, when the surface is in motion, for giving the effect of a visible line progressively moving laterally or normal to the line of motion of the said surface, in combination with a device for periodically rendering the said line visible and mechanism for changing the frequency of the said device.

3. As a means for determining speed of rotation and the position of an object during such rotation, a visible surface connected with such object; means, when the surface is in motion, for giving the effect of a visible line progressively moving laterally or normal to the line of motion of the said surface, in combination with a device for periodically rendering the said means visible and an indicator for such period.

4. As a means for determining speed of rotation and the position of an object during such rotation, a visible means connected with such object; means, when the surface is in motion, for giving the effect of a visible line progressively moving laterally or normal to the line of motion of the said surface, in combination with a device for periodically rendering the means visible, the said means giving the effect of a visible line having a length which constitutes a substantial portion of the circumference.

5. a means for determining speed of rotation and the position of an object during such rotation, a visible surface connected with such object; means, when the object is in motion, for giving the effect of a visible line progressively moving laterally or normal to the line of motion of the said surface, in combination with a relatively movable or portable device for periodically rendering the means visible.

6. As a means for determining the speed of rotation and the position of an object during such rotation, a visible surface connected with such object bearing a spiral line extending a substantial portion of the circumference upon such surface, the progression of the spiral being lateral or normal to the line of travel of the surface in combination with a device for periodically rendering the said line visible.

7. As a means for determining speed of rotation and the position of an object during such rotation, a visible surface connected with such object; means, when the surface is in motion, of giving the effect of a visible line progressively moving laterally or normal to the line of motion of the said surface in combination with an independently power driven device for periodically rendering the said means visible.

8. As a means for determining speed of rotation and the position of an object during such rotation, a visible surface connected with such object, means when the surface is in rotation for giving the effect of a visible line progressively moving laterally or normal at once to the line of sight and also to the line of motion of said surface, in combination with a device for periodically rendering the said means visible.

9. In stroboscopic apparatus for determination of speed of a rotating object, a spiral line substantially such as described upon the object in combination with a device for periodically rendering the said line visible, comprising the following elements: a variable-speed revolving member provided with apertures and an indicator for the speed of such revolving member.

10. In stroboscopic apparatus for determination of speed of a rotating object, a spiral line substantially such as described upon the object in combination with a device for periodically rendering the said line visible, comprising the following elements: a revolving member provided with apertures, an indicator for the speed of such revolving member and a means for changing the number of said apertures.

11. In stroboscopic apparatus for determination of speed of a rotating object, a spiral line substantially such as described upon the object in combination with a device for periodically rendering the said line visible, comprising the following elements: a revolving member provided with apertures, a motor driving such revolving part; means connected with the motor for varying the speed at will and an indicator of such speed.

12. In stroboscopic apparatus for determination of speed of a rotating object, a spiral line substantially such as described upon the object in combination with a device for periodically rendering the said line visible, comprising the following elements: a plurality of members revolving as a unit with apertures so arranged that differing numbers of such apertures register with each other and an indicator of speed of such revolving unit.

13. In stroboscopic apparatus for determination of speed of a rotating object, a spiral line substantially such as described upon the object in combination with a device for periodically rendering the said line visible, comprising the following elements: a plurality of members revolving as a unit with differently positioned apertures, an indicator of speed of such revolving members and means for altering the relative position of the said unit.

14. In stroboscopic apparatus for determination of speed of a rotating object, a spiral line substantially such as described upon the object in combination with a device for periodically rendering the said line visible, comprising the following elements: a revolving member provided with apertures, the said member constituting a disk with a conical face, the apertures being located within the conical portion thereof, an indicator of speed of such revolving part and means for changing the number of said apertures.

15. In stroboscopic apparatus for determination of speed of a rotating object, a spiral line substantially such as described upon the object in combination with a device for periodically rendering the said line visible, comprising the following elements: a revolving member provided with apertures, means for driving such revolving member, an indicator of the speed of such rotation and a peering tube forming a part of such device.

16. As a means for determining speed of rotation of an object, a visible surface connected with such object, means when the surface is in rotation for giving the effect of a visible line progressively moving laterally or with a component of motion normal to the line of vision, a device for periodically rendering the said means visible, in combination with apparatus for determining the said period.

17. As a means for determining speed of rotation of an object, a visible surface connected with such object, means when the surface is in rotation for giving the effect of a visible line progressively moving laterally or with a component of motion normal to the line of vision, a device for periodically rendering the said means visible, mechanism for altering the period, in combination with apparatus for determining such period.

In testimony whereof I have affixed my signature in presence of two witnesses.

ELMER A. SPERRY.

Witnesses:
 HANNIBEL C. FORD,
 FRED C. NARVZSEN.